US008380243B2

United States Patent
Zhang et al.

(10) Patent No.: US 8,380,243 B2
(45) Date of Patent: Feb. 19, 2013

(54) DUAL-MODE DIGITAL MOBILE COMMUNICATION TERMINAL ENABLING CDMA AND GSM

(75) Inventors: Yongliang Zhang, Shenzhen (CN); Ran Qi, Shenzhen (CN); Lei Ma, Shenzhen (CN); Fangxi Hou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/512,339

(22) PCT Filed: Apr. 9, 2010

(86) PCT No.: PCT/CN2010/071670
§ 371 (c)(1),
(2), (4) Date: May 28, 2012

(87) PCT Pub. No.: WO2010/148706
PCT Pub. Date: Dec. 29, 2010

(65) Prior Publication Data
US 2012/0231835 A1    Sep. 13, 2012

(30) Foreign Application Priority Data
Dec. 16, 2009    (CN) .......................... 2009 1 0242528

(51) Int. Cl.
*H04M 1/00*    (2006.01)
(52) U.S. Cl. ..................... 455/552.1; 370/338
(58) Field of Classification Search ............... 455/552.1; 370/338
See application file for complete search history.

(56) References Cited

U.S. PATENT DOCUMENTS
7,814,237 B2 * 10/2010 Lee et al. ........................ 710/14
(Continued)

FOREIGN PATENT DOCUMENTS
| CN | 101068412 A | 11/2007 |
| CN | 201114641 Y | 9/2008 |
| CN | 101350975 A | 1/2009 |
| CN | 101360293 A | 2/2009 |

OTHER PUBLICATIONS

International Search Report in international application No. PCT/CN2010/0716701, mailed on Sep. 23, 2010.
English Translation of the Written Opinion of the International Search Authority in international application No. PCT/CN2010/071670, mailed on Sep. 23, 2010.

*Primary Examiner* — Rafael Pérez-Gutiérrez
*Assistant Examiner* — Liton Miah
(74) *Attorney, Agent, or Firm* — Oppedahl Patent Law Firm LLC

(57) ABSTRACT

A dual-mode digital mobile communication terminal enabling Code Division Multiple Access (CDMA) and Global System for Mobile Communications (GSM) is disclosed, in which a processing module functions as a core; both CDMA and GSM wireless modules can be controlled; functions of high performance Bluetooth, camera, and FM receiver, etc. can be expanded; program downloading, debugging information printing and radio calibration, etc. can be implemented in various application states under the two wireless standards, through a five-pin micro USB interface and an eight-pin micro USB interface which are reserved for users, and an optimal arrangement of a series of internal analog switches, use of the interface resources may be maximized and the interfaces may be simplified; further, in the disclosure, various voice application states, such as handheld, earphone, hand-free and bluetooth, can be switched from one to another seamlessly and smoothly; and the hardware compatibility of a dual-mode dual-standby machine enabling CDMA and GSM with a dual-mode single-standby machine enabling CDMA and GSM can be achieved.

14 Claims, 4 Drawing Sheets

U.S. PATENT DOCUMENTS

2005/0268092 A1* 12/2005 Shankar et al. .............. 713/164
2006/0105812 A1* 5/2006 Shin .............................. 455/558
2008/0318621 A1 12/2008 Fan et al.
2009/0172759 A1* 7/2009 Jung ............................. 725/111

* cited by examiner

DUAL-MODE DIGITAL MOBILE COMMUNICATION TERMINAL ENABLING CDMA AND GSM

TECHNICAL FIELD

The disclosure relates to a dual-mode digital mobile communication terminal, and in particular to a dual-mode digital mobile communication terminal enabling Code Division Multiple Access (CDMA) and Global System for Mobile Communications (GSM).

BACKGROUND

With the continuous development of the communication industry, functions of a mobile terminal have been greatly expanded, gradually from the original single function of calling to multimedia functions integrating voice, data, image, music and so on. Mobile terminals generally can be divided into feature phones and smart phones. A smart phone includes the basic function of a feature phone and further has the following features: an open operating system, expandability of hardware and software, and enabling of secondary development by a third party.

With the rapid development of the handhold communication device market, a mobile phone gradually has more and more functions. At present, a mobile phone is no longer a handhold device merely for voice communication, but an embedded communication platform which integrates the auxiliary functions of short message, multimedia message, Internet access and mobile office. A mobile phone which integrates these functions is called a smart phone. In recent years, the operating speed and the functions of embedded processors have been greatly improved, so that many applications, which could only be implemented on a Personal Computer (PC) previously, can be implemented on a handhold device now. The popular features of the mobile phone models newly launched or to be launched includes touch screen, digital camera capable of automatic focus and embedded with GPS positioning information, Three Dimensional (3D) quick GPS navigation, mobile TV, 3D game, video message, email, Near Field Communication (NFC) mobile payment, High Definition (HD) video play, High Speed Downlink Packet Access (HSDPA), virtual big-screen display and desktop Internet browser.

Meanwhile, since wireless communication networks under different standards exist in the native and different foreign countries, dual mode, even multi-mode mobile phones emerge to facilitate users to freely switch between the communication manners under the different standards on a same mobile phone. A smart phone, in terms of hardware, generally consists of an application processor and a wireless modem. For a dual-mode or multi-mode mobile terminal, the number of the wireless modem would increase accordingly.

At present, a popular type of dual-mode digital mobile communication terminals is dual-mode digital mobile communication terminal enabling CDMA and GSM. However, following drawbacks lie within the prior art in implementing the dual-mode digital mobile communication terminal enabling CDMA and GSM:

1) an interface for use by a user and an interface for system debugging and downloading are arranged respectively, thus there are many interfaces; the interface for use by a user can not be used for the system debugging or program downloading for a certain wireless module; while the interface for the system debugging and downloading is usually used only during the development stage and is removed during the mass production stage; in this way, it is generally needed to re-weld the debugging and downloading interface when a fault mobile phone is maintained in the after-sale service stage, which may cause inconvenience to some extent.

2) the interface for use by a user and the interface for system debugging and downloading usually have repeated function or repeated signal definitions, and the debugging and downloading of some modules even have to be performed by means of extra test points, such that each interface can not be used to the greatest extent, and the limited interfaces are unable to perform program downloading, debugging information printing, radio calibration and so on in various application states under dual-mode wireless standards.

3) in the case of various voice application states in the dual modes, it is difficult for the voice switching between handhold, earphone, hand-free and Bluetooth to be performed seamlessly, and the user usually needs to repeatedly perform manual switch on a UI interface, or the switching is not smooth enough, resulting in a certain delay, and thus the user experience is poor.

4) the hardware compatibility of dual-mode dual-standby machines enabling CDMA and GSM with dual-mode single-standby machines enabling CDMA and GSM can not be achieved.

SUMMARY

In view of the above, the main object of the disclosure is to provide a dual-mode digital mobile communication terminal enabling CDMA and GSM, which is capable of simplifying the interfaces, enhancing the smoothness of the switch between CDMA and GSM voices, and achieving the hardware compatibility of a dual-mode dual-standby machine enabling CDMA and GSM with a dual-mode single-standby machine enabling CDMA and GSM.

In order to achieve the object above, the technical solution of the disclosure is implemented by:

a dual-mode digital mobile communication terminal enabling CDMA and GSM includes: a first Universal Serial Bus (USB) connector, a second USB connector, an application processing module, a CDMA wireless module, a GSM wireless module, a first analog switch, a second analog switch, a third analog switch and a fourth analog switch, wherein the first USB connector is connected with a Universal Asynchronous Receiver/Transmitter (UART) interface of the application processing module through the first analog switch to print UART debugging information; the first USB connector is connected with a USB interface of the application processing module through the first analog switch to perform USB-downloading of a program for an application side;

the second USB connector switches between the GSM wireless module and the CDMA wireless module through the second analog switch; the second USB connector is configured to output debugging information of the GSM wireless module and perform radio calibration when the second USB connector switches to the GSM wireless module, and to perform the USB-downloading at a CDMA wireless side and output the debugging information or output UART debugging information at the CDMA wireless side when the second USB connector switches to the CDMA wireless module;

the third analog switch is located in a position where the second analog switch is connected with the fourth analog switch, and the fourth analog switch is located in a position where the third analog switch is connected with the CDMA wireless module, i.e., when the second USB connector is connected with the CDMA wireless module through the second, third and fourth analog switches, the CDMA wireless module is not controlled by the application processing module, and is configured to perform the USB-downloading at the CDMA wireless side and the debugging information output;

the third analog switch is located in a position where the second analog switch is connected with the CDMA wireless module, and the fourth analog switch is located in a position where the CDMA wireless module is connected with the application processing module, i.e., when the second USB connector is connected with the CDMA wireless module through the second and third analog switches, and the application processing module is connected with the CDMA wireless module through the fourth analog switches, the CDMA wireless module is controlled by the application processing module, and is configured to output the UART debugging information at the CDMA wireless side.

The application processing module communicates with the GSM wireless module through a UART bus;

the application processing module communicates with the CDMA wireless module through a USB interface.

the third analog switch is connected to a USB channel by default to be connected with the fourth analog switch, and is connected to the CDMA wireless module through the fourth analog switch.

The application processing module performs Attention (AT) communication with the CDMA wireless module and the GSM wireless module through a group of specialized handshaking signals with a certain degree of time division multiplexing function.

The dual-mode digital mobile communication terminal enabling CDMA and GSM further includes: a Bluetooth module, an audio encoder/decoder, a loudspeaker, telephone receiver, a microphone, a fifth analog switch and a sixth analog switch, wherein the fifth analog switch is configured to switch the Bluetooth module between connection with the GSM wireless module and connection with the CDMA module, and is controlled by the application processing module via a high/low voltage level;

the sixth analog switch is configured to switch the audio encoder/decoder module between connection with the GSM wireless module and connection with the CDMA module, and is controlled by the application processing module via a high/low voltage level which is same as and synchronous to that for controlling the fifth analog switch;

the loudspeaker, the telephone receiver and the microphone are connected to the audio encoder/decoder module, and are configured to receive an analog audio from the audio encoder/decoder module or to send an analog audio to the audio encoder/decoder module respectively.

Both the CDMA wireless module and the GSM module are in a master mode.

The dual-mode digital mobile communication terminal enabling CDMA and GSM further includes: a first card slot, a second card slot, a seventh analog switch and an eight analog switch, wherein the seventh analog switch and the eight analog switch are controlled by the application processing module in a time sharing manner to connect a User Identifier Module (UIM) card interface of the CDMA module and a Subscriber Identity Module (SIM) card of the GSM module to the two card slots, respectively, to freely switch the CDMA wireless module and the GSM wireless module between the two card slots.

The first USB connector is a five-pin micro connector and the second USB connector is an eight-pin micro connector.

In the dual mode digital mobile communication terminal enabling CDMA and GSM according to the disclosure, an application processing module with processing functions capable of processing high-performance stream media application and the like can function as a core; both CDMA and GSM wireless modules can be controlled; functions of high performance Bluetooth, camera, and FM receiver, etc. can be expanded; program downloading, debugging information printing and radio calibration, etc. can be implemented in various application states under the two wireless standards, through a five-pin micro USB interface and an eight-pin micro USB interface which are reserved for users, and an optimal arrangement of a series of internal analog switches; use of the interface resources may be maximized and the interfaces may be simplified. Further, in the disclosure, various voice application states, such as handheld, earphone, hand-free and bluetooth, can be switched from one to another seamlessly and smoothly. Additionally, the system architecture is in good compatibility in terms of dual-mode dual-standby machines and dual-mode single-standby machines, i.e., the hardware compatibility of a dual-mode dual-standby machine enabling CDMA and GSM with a dual-mode single-standby machine enabling CDMA and GSM can be achieved.

DETAILED DESCRIPTION

The basic principle of the disclosure lies in that: an application processing module with smart processing functions capable of processing high-performance stream media application and the like can function as a core; both CDMA and GSM wireless modules can be controlled; functions of high performance Bluetooth, camera, and FM receiver, etc. can be expanded; program downloading, debugging information printing and radio calibration, etc. can be implemented in various application states under the two wireless standards, through a five-pin micro USB interface and an eight-pin micro USB interface which are reserved for users, and an optimal arrangement of a series of internal analog switches; various voice application states, such as handheld, earphone, hand-free and bluetooth, can be switched from one to another seamlessly and smoothly; and the hardware compatibility of dual-mode dual-standby/single-standby of CDMA and GSM can be achieved.

Figure 1:
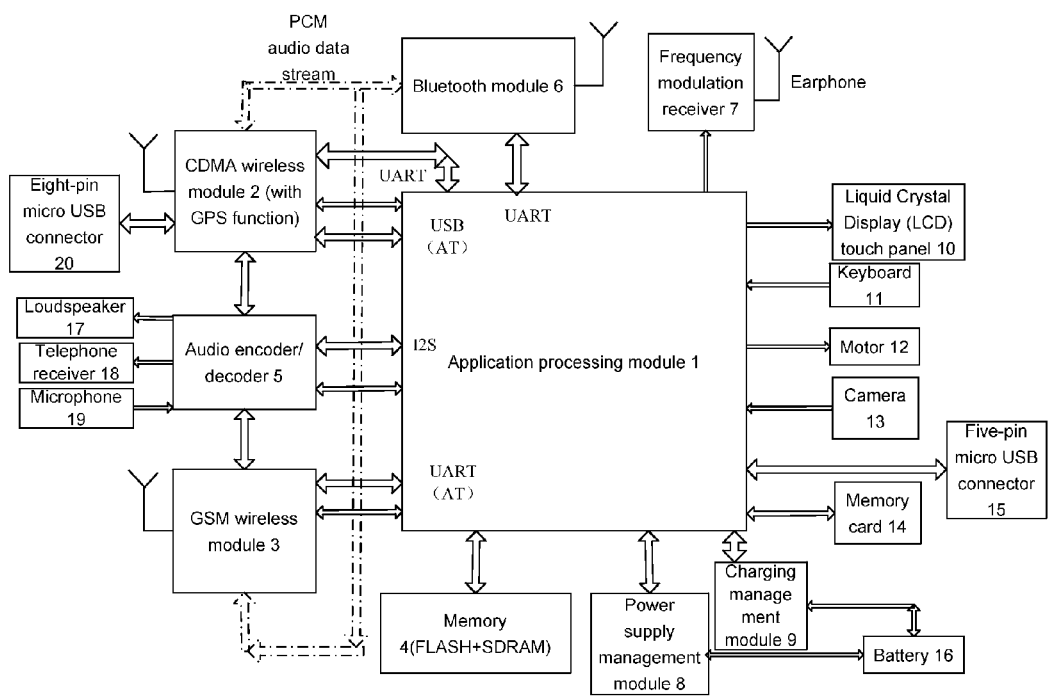
FIG. 1 shows a schematic view of an entire framework of a dual-mode digital mobile communication terminal enabling CDMA and GSM.

FIG. 1 shows a schematic view of an entire framework of a dual-mode digital mobile communication terminal enabling CDMA and GSM. As shown in FIG. 1, the dual-mode digital mobile communication terminal enabling CDMA and GSM according to this disclosure consists of an application processing module 1, a CDMA wireless module 2, a GSM wireless module 3, a memory 4, an audio encoder/decoder 5, a Bluetooth module 6, an FM receiver 7, a power supply management module 8, a charging management module 9, a Liquid Crystal Display (LCD) touch panel 10, a keyboard 11, a motor 12, a camera 13, a memory card 14, a five-pin micro USB connector 15, a battery 16 to which the power supply management module 8 and the charging management module 9 are connected externally, a loudspeaker 17, a telephone receiver 18 and a microphone 19 to which the audio encoder/decoder 4 is connected externally, and an eight-pin micro USB connector 20 connected with the CDMA wireless module.

In FIG. 1, the application processing module 1 is located in a core position, and communicates with the CDMA wireless module 2 through a USB; the application processing module 1 interacts with the GSM wireless module 3 through a UART by way of sending a control instruction "Attention" (AT) by the terminal equipment (TE) to a mobile station (MS); the application processing module 1 is connected with the audio encoder/decoder 5 through an Inter-IC Sound (I2S) bus, which is a bus standard established for audio data transmission between digital audio devices by the Philips Company; the application processing module 1 communicates with the Bluetooth module 6 through a UART bus.

In addition, the memory 4 shown in FIG. 1 only corresponds to and serves the application processing module 1, and is generally an ONENAND quickly erasable (FLASH) mass memory, that is, NAND FLASH of a NOR interface pattern; here, NOR and NAND are two types of memory mediums respectively, wherein the NOR interface is simple but the capacity is not large, while the capacity of NAND can be very large; each of the CDMA wireless module 2 and the GSM wireless module 3 has a FLASH (a pattern of synchronous dynamic random access memory (SDRAM) & NAND FLASH) served for the CDMA wireless module 2 and the GSM wireless module 3 per se.

The application processing module 1 according to this disclosure functions as a core. As to the two wireless modules, the CDMA wireless module 2 is relatively more important, because besides the basic wireless functions of voice and short message that both the wireless modules have, the GPS positioning function and Wireless networking based on a connection with a PC data line are performed through the CDMA side, while the relevant functions are not performed at GSM side.

This disclosure may employ an application processing module 1 provided by the dominant provider in the industry that is capable of processing complex stream media and has multiple functional interfaces, a CDMA wireless module 2 with modulation and demodulation functions of double frequencies of 800/1900 MHz and a GPS function platform, a GSM wireless module 3 of double frequencies of 800/1900 MHz, a mass memory 4, an audio encoder/decoder 5 capable of performing touch screen information detection and ADC sample, a Bluetooth module 6 with data and voice function, an FM receiver 7 with an optional built-in or externally-connected earphone, and peripheral devices such as an LCD display panel configured with a touch function, a motor, a keyboard, a camera, a memory card, etc., so as to set up a digital mobile communication terminal system with audio, video, data and stream media application processing functions, in which the CDMA wireless modem module, the GSM wireless module and the other peripheral modules are mastered by the application processing module. The terminal system can implement a series of functions, such as wireless communication in dual modes of CDMA and GSM (the standby mode is optional, which can be dual-standby or single-standby), GPS positioning navigation, Bluetooth, FM receiver, expandable storage and high-quality photographing/video-graphing, and can perform other application functions such as USB flash disk, card identification and electronic document processing according to the development requirements.

The LCD, keyboard and other periphery devices mentioned in this disclosure have few differences from the processing of the present common digital mobile communication terminal; and the inventive points lie in switch between the two modes, debugging information printing, the voice (including Bluetooth voice) switch between CDMA and GSM and the compatible hardware design of the dual-mode dual-standby/single-standby machine enabling CDMA and GSM.

The implementation of the technical solution is further illustrated below in detail in conjunction with accompanying drawings.

Figure 2:
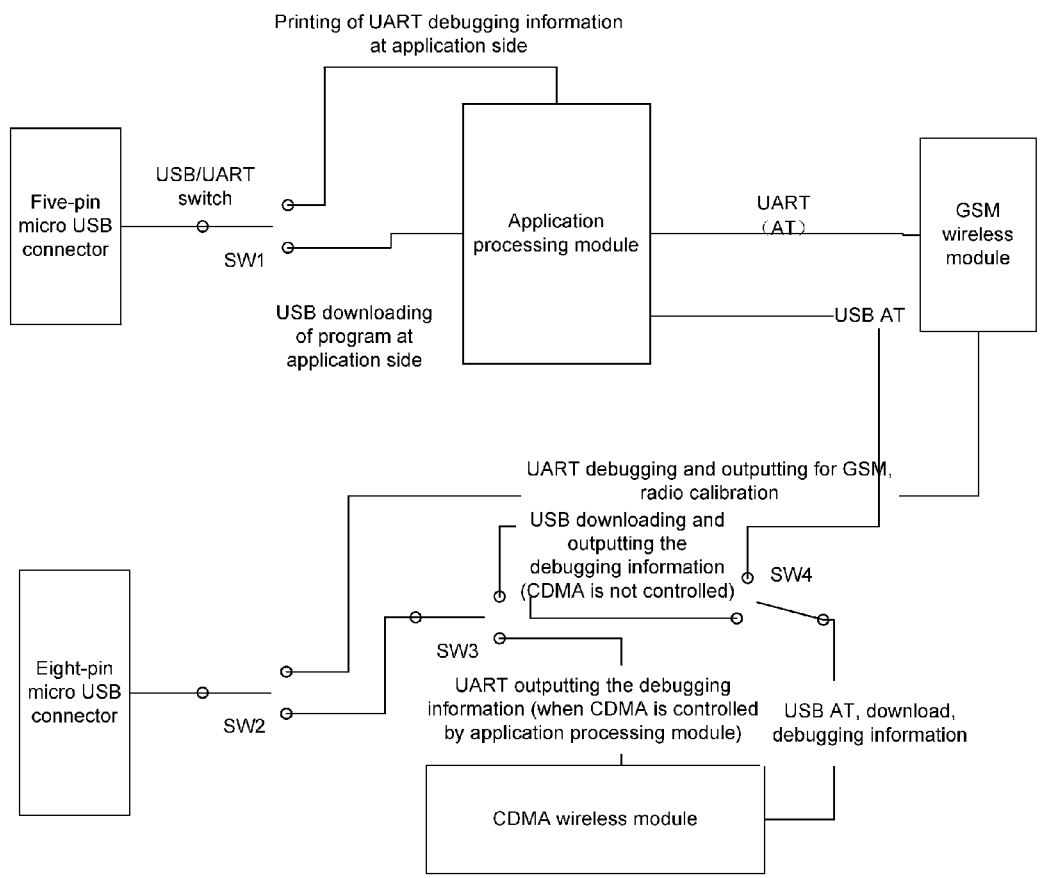
FIG. 2 shows a structure schematic view of the dual-mode digital mobile communication terminal enabling CDMA and GSM according to this disclosure, in which a solution of downloading and debugging information printing in the dual modes of CDMA and GSM is implemented.

FIG. 2 shows a structure schematic view of a solution of downloading and debugging information printing in the dual modes of CDMA and GSM implemented in the dual-mode digital mobile communication terminal enabling CDMA and GSM according to this disclosure; As shown in FIG. 2, the solution of downloading and debugging information printing in the dual modes of CDMA and GSM implemented in the dual-mode digital mobile communication terminal enabling CDMA and GSM according to this disclosure involves a five-pin micro USB connector 15, an eight-pin micro USB connector 20, an application processing module 1, a CDMA wireless module 2 and a GSM wireless module 3.

Wherein, the five-pin micro USB connector 15 is connected with the application processing module 1 through an analog switch SW1 to switch between the USB downloading and the UART debugging information printing. Specifically, when the five-pin micro USB connector 15 is connected with a UART interface of the application processing module 1 through the analog switch SW1, the UART debugging information can be printed; when the five-pin micro USB connector 15 is connected with a USB interface of the application processing module 1 through the analog switch SW1, the USB downloading of a program for an application side can be performed.

Compared with the five-pin micro USB connector, the eight-pin micro USB connector 20 is further associated with relevant signals of the charging voltage source VCharger for the CDMA and the stereo earphone, can be used for the start of the CDMA wireless module VCharger and for the earphone audio transceiving for the externally-connected, well-matched dedicated earphone serving as a complete machine. In this disclosure, the eight-pin micro USB connector 20 can switch between the GSM wireless module 3 side and the CDMA wireless module 2 side through an analog switch SW2; when the eight-pin micro USB connector 20 switches to the GSM wireless module 3 side, the eight-pin micro USB connector 20 is configured to output the debugging information for the GSM wireless module and to perform radio calibration. It should be noted that the dual-mode digital mobile communication terminal enabling CDMA and GSM further includes two analog switches SW3 and SW4; when the eight-pin USB connector 20 switches to the CDMA wireless module 2 side through the analog switch SW2, and the eight-pin micro USB connector 20 is connected with the CDMA wireless module 2 through the analog switches SW2, SW3 and SW4, that is, the analog switch SW3 is located in a position in which the analog switch SW2 is connected with the analog switch SW4, and the analog switch SW4 is located in a position in which the analog switch SW3 is connected with the CDMA wireless module 2 (the above may be implemented in the default state designed by the hardware circuit). In this state, the CDMA wireless module is individually powered and started by the eight-pin micro USB, the application processing module 1 is not started, the CDMA wireless module is not controlled by the application processing module 1, and thus is configured to perform the USB downloading and the debugging information output from the CDMA wireless side; In contrast, in another case, when the wireless application module 1 has been started and is in a controlling state as a core of the system, the CDMA wireless module 2 is controlled by the application processing module 1; at this moment, the eight-pin micro USB connector 20 should be connected with the CDMA wireless module 2 through the analog switches SW2 and SW3, the application processing module 1 is connected with the CDMA wireless module 2 through the SW4, that is, the SW3 should be located in a position in which the SW2 is connected with the CDMA wireless module 2, and the SW4 should be located in a position in which the CDMA wireless module 2 is connected with the application processing module 1, to output the UART debugging information from the CDMA wireless side.

In other words, the above description that the CDMA wireless module is controlled by the application processing module refers to that: the CDMA wireless module can determine, by controlling the switch of the analog switch SW4, whether the channel is used for the USB downloading and the debugging information outputting from the CDMA wireless side or for the AT communication between the application processing module and the CDMA wireless module. The application processing module performs AT communication with the GSM wireless module through a UART bus.

The specific application of the connections of the USB connector with the application processing module, the CDMA wireless module and the GSM wireless module are illustrated in detail by two examples below:

1) the downloading, debugging, number-writing, calibration and final test of the CDMA wireless module and the communication with the application processing module.

For performing the downloading, debugging, number-writing, calibration and final test, the CDMA wireless module needs to be connected with a special five-pin micro USB data line (using the USB_ID of a common five-pin USB data line to supply the BAT+ power) which can supply BAT+ power or uses a battery to supply power, and is then inserted with an eight-pin micro USB data line, wherein the Vcharger of the data line supplies the start voltage of the CDMA wireless module; the baseband master chip of the CDMA wireless module uses a General Purpose Input/Output (GPIO) interface to control the analog switches SW2, SW3 and SW4 to switch to the CDMA USB channel; the application processing module dose not intervene the CDMA wireless module; the USB channel of the CDMA wireless module is connected with the eight-pin data line (the USB channel simultaneously corresponds to DATA, DIAG port attributes of high-pass USB protocol); the CDMA turns on its own USB transceiver power; a PC is connected with the CDMA wireless module, such that a program can be downloaded for the CDMA wireless module, and the number-writing, calibration and final test of the CDMA wireless module can be performed during the production test.

For the downloading of the CDMA wireless module, if there is no program in the memory of the original CDMA wireless module or the program has been lost, the downloading can be performed through a Joint Test Action Group (JTAG) test point preserved on the circuit board by using a self-developed USB/JTAG download tool or an emulation tool TRACE32; if the CDMA wireless module has a program therein, the downloading can be performed through a USB interface signal on the eight-pin micro USB connector.

The application processing module communicates with the CDMA wireless module through a USB interface; the internal of the application processing module has two USB ports: USBC, that is, USB Client, which communicates with PC; USBH, that is, USB Host, which communicates with CDMA wireless module; in which, the USBH is connected with the CDMA USB. The USB communication interface between two modules is the analog switch SW4, wherein the analog switch SW4 is controlled by the CDMA wireless module and is only switched on during the AT communication between the application processing module and the CDMA wireless module; in other states, the analog SW4 is switched off.

It should be noted that the application processing module performs AT communication with the CDMA wireless module and the GSM wireless module through a series of dedicated highly simplified handshaking signals which can be time division multiplexed to a certain degree.

In order to achieve the AT communication between the application processing module and the CDMA wireless module, besides the USB interface, a group of handshaking signals (including STATUS, READY, Request (IRQ) and other signals) are further involved, wherein the handshaking between the application processing module and the CDMA wireless module is implemented through the GPIO port; the handshaking signals therebetween is as shown in Table 1 specifically:

TABLE 1

| Signal name | Direction (relative to application processing module) | Significance |
| --- | --- | --- |
| APP_STATUS | Output | Whether application processing module (APP) is in sleep state |
| CDMA_STATUS | Input | Operating state of CDMA: Function 1: CDMA on, off state Function 2: whether CDMA is sleeping |
| APP_WAKEUP_CDMA (APP_IRQ) | Output | Signal sent by application processing module to CDMA: Function 1 WAKEUP: wake up CDMA wireless module Function 2 IRQ: application processing module issues AT communication request |

TABLE 1-continued

| Signal name | Direction (relative to application processing module) | Significance |
| --- | --- | --- |
| CDMA_IRQ | Input | Signal sent by CDMA to application processing module:<br>Function 1: wake up application processing module<br>Function 2: CDMA issues AT communication request |
| APP_AT_READY | Output | Application processing module is ready for AT |
| CDMA_AT_READY | Input | CDMA is ready for AT |
| CDMA_ON | Output | CDMA is started |
| CDMA_ABNORM_CRRL | Output | Reset CDMA (abnormal state) |

The CDMA USB and the CDMA UART are switched through the analog switch SW3 and are connected to the USB channel by default, that is, connected with the SW4, and are connected to the CDMA wireless module through the analog switch SW4, so that the CDMA wireless module has an independent downloading and debugging function without being controlled by the application processing module, compared with the GSM wireless module.

When the complete machine is started, after the application processing module is started normally and enables the CDMA wireless module, the CDMA wireless module uses the GPIO port to control the switch of the analog switch mentioned above according to the following two specific use conditions:

A) normal start, the application processing module starts the CDMA wireless module through CDMA_ON, the application processing module determines whether the start is completed through querying CDMA_STATUS and then issues an AT communication request APP_WAKE-UP_CDMA (APP_IRQ) to notify the CDMA to turn on the power supply of the USB transceiver; meanwhile, the CDMA wireless module controls the analog switch SW4 to connect the USBH of the application processing module with the USB of the CDMA. The state in which the original CDMA USB is connected with the eight-pin micro USB connector is changed into a state in which the CDMA USB is connected with the USBH interface of the application processing module.

Before AT communication, it is needed to perform the handshaking on whether the AT communication is ready, wherein the handshaking can be completed by using APP_STATUS, CDMA_STATUS, APP_IRQ, CDMA_IRQ, APP_AT_READY, CDMA_AT_READY; specifically, the operation that the CDMA actively initiates the AT communication includes: querying APP_STATUS, sending CDMA_IRQ, obtaining an APP_AT_READY response and beginning AT sending.

B) when the CDMA performs the AT communication with the application processing module, the CDMA side needs to print the debugging information, wherein an engineering mode or a long-press key can be preset to notify the application processing module of the CDMA's debugging requirement; the application processing module requires the CDMA wireless module to change the port attributes of the CDMA USB through the AT communication, so as to change the attributes that the previous CDMA USB channel is corresponding to both DATA/DIAG ports into the attributes that the CDMA USB channel is corresponding to DATA port and the CDMA UART is corresponding to DIAG port. The application processing module controls the analog switch at the eight-pin connector to connect the CDMA UART with the eight-pin connector, for the PC to print debugging information of the CDMA side.

2) the downloading, debugging, number-writing, calibration and final test of the GSM wireless module and the communication with the application processing module.

The GSM module is started, and needs a special five-pin micro USB data line (using the USB_ID of a common five-pin USB data line to supply the BAT+ power) which can supply BAT+ power or uses a battery to supply power.

The GSM debugging UART, CDMA USB and CDMA UART are multiplexed on the eight-pin micro USB connector, wherein in the default state, the GSM debugging UART (the CDMA wireless module is not started) is connected, for the convenience of the debugging, number-writing, calibration and final test of the GSM wireless module.

In order to illustrate the downloading of the GSM wireless module, first, the downloading by the application processing module will be described. The application processing module downloads boot codes "Boot" through a JTAG port of the application processing module, and downloads the system mirror file to the SDRAM through the USB function in the hardware test software mode at the mobile phone side with FLASH and USB drives after the codes "Boot" is run, and then makes the downloading program in the FLASH run in the SDRAM to write the system mirror file to OneNand of the application processing module.

The beginning of the downloading process of the GSM wireless module is similar to that of the application processing module. The mirror file of the wireless module is downloaded to the SDRAM of the application circuit after running the codes "Boot"; however, the downloading is completed by putting the PC side code of the GSM downloading program to the hardware-testing software with FLASH and USB drives, in this way, the program downloading at the GSM wireless side can be quickly completed in the downloading agent mode inside the application processing module (at this moment, only the PC side code including the GSM downloading program and the program code of the GSM module itself are downloaded to a specific space designated by the FLASH associated with the application processing module), and the following downloading process is an off-line downloading process, that is, as long as the mobile phone keeps being powered, the five-pin USB connector can be removed, the mobile phone is departed from the PC and runs the PC side code of the GSM downloading program for the wireless module just downloaded to the specific space designated by the FLASH associated with the application processing module, and continues, by running the code, to download the program code for the GSM module itself just downloaded to the specific space designated by the FLASH associated with the application processing module into the FLASH of the GSM module itself, so as to complete the downloading of the entire code for the GSM wireless side.

The GSM wireless modules performs AT communication with the application processing module using its own standard UART, and is similar to the AT communication between the CDMA wireless module and the application processing module; besides the UART communication, the application processing module and the GSM wireless module also need some handshaking signals; Table 2 shows the content of the handshaking signals between the application processing module and the GSM wireless module:

TABLE 2

| Signal name | Direction (relative to application processing module) | Significance |
|---|---|---|
| GSM_IRQ | Input | Signal sent by GSM to application processing module: Function 1: wake up application processing module Function 2: GSM sends AT communication request |
| APP_GSM_IRQ | Output | Signal sent by application processing module to GSM: Function 1 WAKEUP: wake up GSM module Function 2 IRQ: application processing module issues AT communication request |
| GSM_ABNARMAL_CTRL | Output | Reset GSM (abnormal state) |
| GSM_ON | Output | GSM is started |

As shown in table 2, the handshaking signals are relatively fewer, and there are no handshaking such as READY and STATUS. This is because that the specific AT processing mechanisms employed in the two kinds of communications are different. The AT command at the GSM side is not processed by a module collectively but divided into a plurality of subsystems according to the features of the AT command; further, many related management module and interfaces are added.

In addition, it should be noted that the embodiment is illustrated by taking the five-pin micro USB connector and the eight-pin micro USB connector as an example; however, in practical applications, it is not limited to these two USB connectors.

Figure 3:
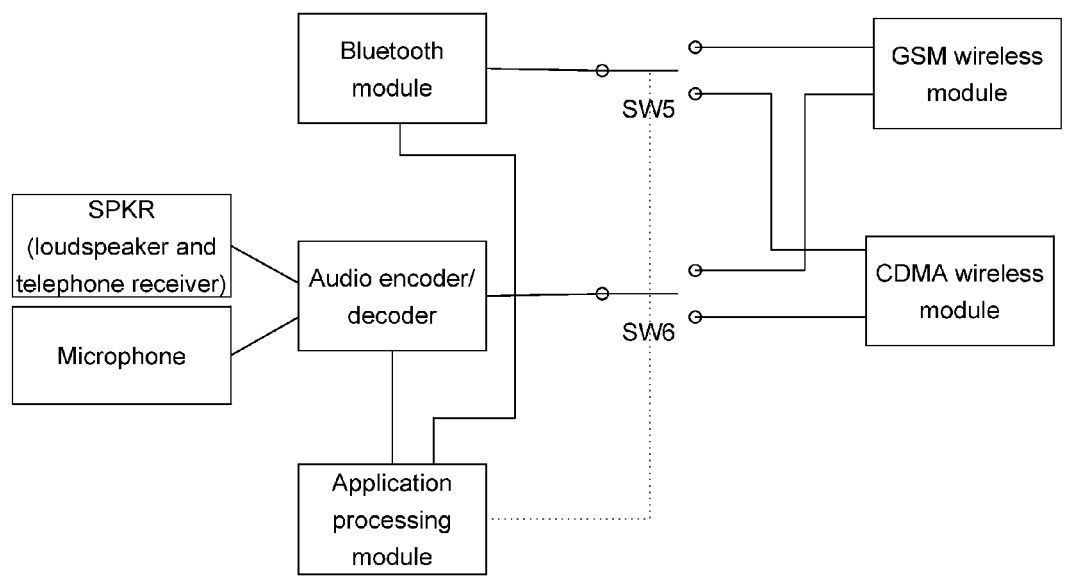
FIG. 3 shows a structure schematic view of the dual-mode digital mobile communication terminal enabling CDMA and GSM according to this disclosure, in which voice switch (including Bluetooth voice) between CDMA and GSM is performed.

FIG. 3 shows a structure schematic view of performing voice switch (including Bluetooth voice) between CDMA and GSM in the dual-mode digital mobile communication terminal enabling CDMA and GSM according to this disclosure. As shown in FIG. 3, the voice switch (including Bluetooth voice) between CDMA and GSM in the dual-mode digital mobile communication terminal enabling CDMA and GSM according to this disclosure involves a Bluetooth module, an audio encoder/decoder, an application processing module, a GSM wireless module and a CDMA wireless module. The Bluetooth earphone accesses the Bluetooth module in a wireless manner; in a regular application mode, the Pulse Code Modulation (PCM) audio data stream of the Bluetooth module would be input/output to the CDMA wireless module, and then be input/output to an air interface. However, since there is a scenario that the user uses the Bluetooth earphone to perform a call while surfing the Internet, the input/output between the Bluetooth PCM audio data stream and the GSM wireless module must be taken into account.

As shown in FIG. 3, the application processing module performs the communication protocol interaction with the Bluetooth module through the UART; the application processing module and the audio encoding/decoding module transmit digital voice streams (the digital stream media stored in the application processing module, such as mp3, mp4, etc., are played by the audio encoding/decoding module) therebetween through the I2S bus; the PCM digital audio streams of the CDMA wireless module and the GSM wireless module can arrive at the Bluetooth module through the analog switch SW5; the analog switch SW5 is controlled by a GPIO port of the application processing module via a high/low voltage level, so that the Bluetooth module can be switched between the communication with the CDMA wireless module and the communication with GSM wireless module.

SPKR (including both loudspeaker and telephone receiver) and Mic (microphone) are connected to the audio encoding/decoding module, to receive an analog audio signal from the audio encoding/decoding module and send an analog audio signal to the audio encoding/decoding module, wherein the two analog audio signals are not subjected to digital process but only to signal amplification in the audio encoding/decoding module. Therefore, the signal output from the audio encoding/decoding module still is an analog audio signal. In this way, by synchronously controlling the analog switch SW6 through the same GPIO as being used by the application processing module to control the SW5 as described above, the analog audio signal of the CDMA wireless module or the GSM module can be connected to the SPKR and Mic through the audio encoding/decoding module in a certain GPIO voltage level state, that is, both the SPKR and Mic can only be connected to one module of the CDMA and GSM at one time, and the one module is same as that connected to the PCM.

This connection takes into account the configurations of the Bluetooth PCM digital audio stream with respect to both the CDMA wireless module and the GSM module, and enables the switch of the Bluetooth PCM digital audio stream between the two modules without delay. In practical applications, since some wireless modules have requirements on the master device and the slave devices, it would be better if both the selected two wireless modules are in a master mode or in a slave mode, otherwise, a notable delay would be caused. In the disclosure, preferably, both the CDMA wireless module and the GSM module are in a master mode. Moreover, many aspects, such as the clock frequency, encoding mode and frame synchronization mode, are taken into account in equivalent conditions, since only in this way, the audio switch solution provided in this disclosure can achieve an optimum effect.

Figure 4:
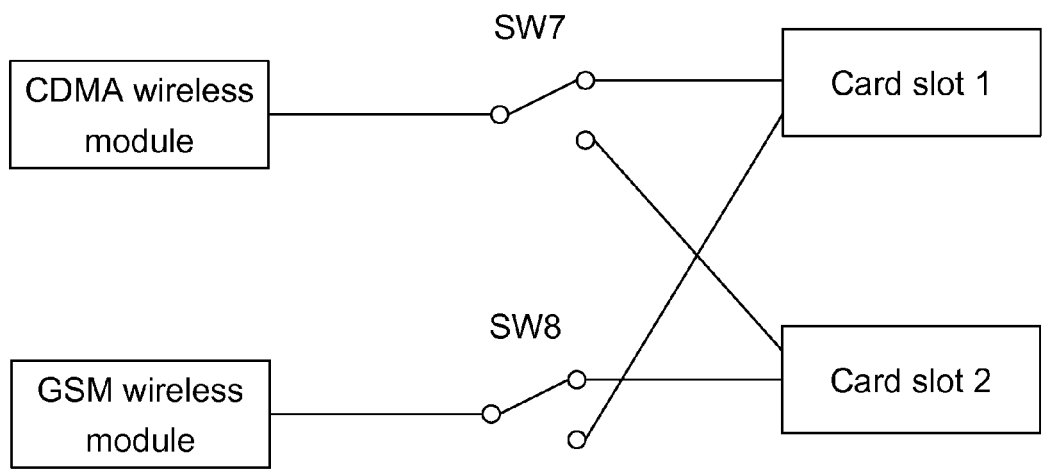
FIG. 4 shows a structure schematic view of a dual-mode dual-standby machine enabling CDMA and GSM.
Figure 5:
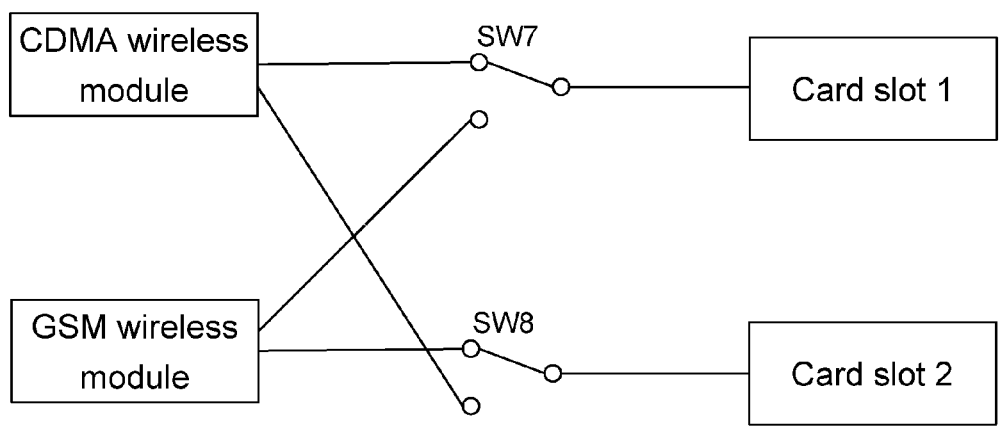
FIG. 5 shows a structure schematic view of a dual-mode single-standby machine enabling CDMA and GSM.

FIGS. 4 and 5 show a structure schematic view of the dual-mode digital mobile communication terminal enabling CDMA and GSM according to this disclosure, in which hardware compatibility for dual-mode dual-standby machines and dual-mode single-standby machines enabling CDMA and GSM are implemented; FIG. 4 shows a structure schematic view of the dual-mode dual-standby machine enabling CDMA and GSM, and FIG. 5 shows a structure schematic view of the dual-mode single-standby machine enabling CDMA and GSM. As shown in FIGS. 4 and 5, the dual-mode digital mobile communication terminal enabling CDMA and GSM according to this disclosure, in which hardware compatibility for dual-mode dual-standby and dual-mode single-standby machines enabling CDMA and GSM are implemented, involves: a CDMA wireless module, a GSM wireless module, a first card slot, a second card slot, a seventh analog switch SW7 and an eight analog switch SW8. The analog switch SW7 and the analog switch SW8 are controlled by the application processing module in a time sharing manner to connect a User Identifier Module (UIM) card interface of the CDMA module and a Subscriber Identity Module (SIM) card of the GSM module to the two card slots, respectively, to freely switch the CDMA wireless module and the GSM wireless module between the two card slots. In the disclosure, a hardware compatibility design is performed on the inlead wire and outlead wire of the analog switches required for the dual-mode switching involved. That is, to fulfill different requirements of a dual-standby machine (in which the CDMA wireless module and the GSM module may access their respective UIM card and SIM card at the same time) and a single-standby machine (in which the CDMA wireless module and the GSM module cannot access their respective UIM card and SIM card at the same time, a single card design may be employed, however, for the purpose of design compatibility and reducing the PCB development cost for specifically designing a single-standby machine, a schematic view design of double cards is employed, while only one card base is mounted during the Surface Mount Technology (SMT) production), a jumper connection using a 0 ohm-resistance across the analog switches SW7 and SW8 are designed according to their own topologies in terms of both schematic view and layout & tracing, and optimization is performed in terms of corresponding signal integrity.

It should be noted that the card slot 1 and the card slot 2 in this disclosure should not be understood conventionally and correspond to a UIM card and a SIM card, respectively. The UIM card relates to the mobile communication terminal user identification and encryption technique proposed by China Unicom and supported by the international CDMA organization (CDG), supports specific authentication encryption algorithms and Over The Air (OTA) techniques, and may update and manage the data on the card by way of the wireless air interface. The UIM card has a function similar to that of the SIM card used in the Quanqiutong GSM machine, can identify the user and encrypt the communication, and can also store telephone numbers, short messages and other personal information. The SIM card is also called a smart card or a user identification card. A GSM digital mobile phone must be installed with the card for use. The SIM card stores information of the digital mobile telephone client and the encryption key in a CPU chip, can authenticate the GSM network client identification and encrypt voice information during a call performed by the client. The CDMA wireless module of the disclosure is connected to the card slot 1 (UIM/dual-mode card) or the card slot 2 (UIM/dual-mode card/SIM) respectively under the control logic of the analog switch.

The above descriptions are only the preferred embodiments of the disclosure and are not intended to limit the protection scope of the disclosure.

The invention claimed is:

1. A dual-mode digital mobile communication terminal enabling Code Division Multiple Access (CDMA) and Global System for Mobile Communications (GSM), comprising: a first Universal Serial Bus (USB) connector, a second USB connector, an application processing module, a CDMA wireless module, a GSM wireless module, a first analog switch, a second analog switch, a third analog switch and a fourth analog switch, wherein
   the first USB connector is connected with a Universal Asynchronous Receiver/Transmitter (UART) interface of the application processing module through the first analog switch to print UART debugging information; the first USB connector is connected with a USB interface of the application processing module through the first analog switch to perform USB-downloading of a program for an application side;
   the second USB connector switches between the GSM wireless module and the CDMA wireless module through the second analog switch; the second USB connector is configured to output debugging information of the GSM wireless module and perform radio calibration when the second USB connector switches to the GSM wireless module, and to perform the USB-downloading at a CDMA wireless side and output the debugging information or output UART debugging information at the CDMA wireless side when the second USB connector switches to the CDMA wireless module;
   the third analog switch is located in a position where the second analog switch is connected with the fourth analog switch, and the fourth analog switch is located in a position where the third analog switch is connected with the CDMA wireless module, that is when the second USB connector is connected with the CDMA wireless module through the second, third and fourth analog switches, the CDMA wireless module is not controlled by the application processing module, and is configured to perform the USB-downloading at the CDMA wireless side and the debugging information output;
   the third analog switch is located in a position where the second analog switch is connected with the CDMA wireless module, and the fourth analog switch is located in a position where the CDMA wireless module is connected with the application processing module, that is when the second USB connector is connected with the CDMA wireless module through the second and third analog switches, and the application processing module is connected with the CDMA wireless module through the fourth analog switches, the CDMA wireless module is controlled by the application processing module, and is configured to output the UART debugging information at the CDMA wireless side.

2. The dual-mode digital mobile communication terminal enabling CDMA and GSM according to claim 1, wherein the application processing module communicates with the GSM wireless module through a UART bus;
   the application processing module communicates with the CDMA wireless module through a USB interface.

3. The dual-mode digital mobile communication terminal enabling CDMA and GSM according to claim 2, wherein the first USB connector is a five-pin micro connector and the second USB connector is an eight-pin micro connector.

4. The dual-mode digital mobile communication terminal enabling CDMA and GSM according to claim 1, wherein the third analog switch is connected to a USB channel by default to be connected with the fourth analog switch and is connected to the CDMA wireless module through the fourth analog switch.

5. The dual-mode digital mobile communication terminal enabling CDMA and GSM according to claim 4, wherein the first USB connector is a five-pin micro connector and the second USB connector is an eight-pin micro connector.

6. The dual-mode digital mobile communication terminal enabling CDMA and GSM according to claim 1, wherein the application processing module performs Attention (AT) communication with the CDMA wireless module and the GSM wireless module through a group of specialized handshaking signals with a certain degree of time division multiplexing function.

7. The dual-mode digital mobile communication terminal enabling CDMA and GSM according to claim 6, wherein the first USB connector is a five-pin micro connector and the second USB connector is an eight-pin micro connector.

8. The dual-mode digital mobile communication terminal enabling CDMA and GSM according to claim 1, further comprising: a Bluetooth module, an audio encoder/decoder, a loudspeaker, telephone receiver, a microphone, a fifth analog switch and a sixth analog switch, wherein the fifth analog switch is configured to switch the Bluetooth module between connection with the GSM wireless module and connection with the CDMA module, and is controlled by the application processing module via a high/low voltage level;

the sixth analog switch is configured to switch the audio encode/decoder between connection with the GSM wireless module and connection with the CDMA module, and is controlled by the application processing module via the high/low voltage level which is the same as and synchronous to that for controlling the fifth analog switch;

the loudspeaker, the telephone receiver and the microphone are connected to the audio encoder/decoder module and are configured to receive an analog audio from the audio encoder/decoder module or to send an analog audio to the audio encoder/decoder module, respectively.

9. The dual-mode digital mobile communication terminal enabling CDMA and GSM according to claim 8, wherein both the CDMA wireless module and the GSM module are in a master mode.

10. The dual-mode digital mobile communication terminal enabling CDMA and GSM according to claim 9, wherein the first USB connector is a five-pin micro connector and the second USB connector is an eight-pin micro connector.

11. The dual-mode digital mobile communication terminal enabling CDMA and GSM according to claim 8, wherein the first USB connector is a five-pin micro connector and the second USB connector is an eight-pin micro connector.

12. The dual-mode digital mobile communication terminal enabling CDMA and GSM according to claim 1, further comprising: a first card slot, a second card slot, a seventh analog switch and an eight analog switch, wherein the seventh analog switch and the eight analog switch are controlled by the application processing module in a time sharing manner to connect a User Identifier Module (UIM) card interface of the CDMA module and a Subscriber Identity Module (SIM) card of the GSM module to the two card slots, respectively, to freely switch the CDMA wireless module and the GSM wireless module between the two card slots.

13. The dual-mode digital mobile communication terminal enabling CDMA and GSM according to claim 12, wherein the first USB connector is a five-pin micro connector and the second USB connector is an eight-pin micro connector.

14. The dual-mode digital mobile communication terminal enabling CDMA and GSM according to claim 1, wherein the first USB connector is a five-pin micro connector and the second USB connector is an eight-pin micro connector.

* * * * *